(12) United States Patent
Chen et al.

(10) Patent No.: US 9,203,752 B2
(45) Date of Patent: Dec. 1, 2015

(54) METHOD, APPARATUS, AND SYSTEM FOR FORWARDING PACKET IN MULTI-TOPOLOGY NETWORK

(71) Applicant: Huawei Technologies Co., Ltd., Shenzhen (CN)

(72) Inventors: Ying Chen, Shenzhen (CN); Qianglin Zhao, Acton (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 511 days.

(21) Appl. No.: 13/623,220

(22) Filed: Sep. 20, 2012

(65) Prior Publication Data

US 2013/0259035 A1    Oct. 3, 2013

(30) Foreign Application Priority Data

Sep. 23, 2011   (CN) .......................... 2011 1 0286466

(51) Int. Cl.
| | | |
|---|---|---|
| *H04L 12/28* | (2006.01) | |
| *H04L 12/56* | (2006.01) | |
| *H04L 12/46* | (2006.01) | |
| *H04L 12/725* | (2013.01) | |

(52) U.S. Cl.
CPC .......... *H04L 45/741* (2013.01); *H04L 12/4641* (2013.01); *H04L 45/30* (2013.01)

(58) Field of Classification Search
CPC ......... H04L 45/00; H04L 45/02; H04L 45/04; H04L 45/22; H04L 45/24; H04L 45/56; H04L 45/60; H04L 45/74
USPC .................................... 370/389, 395.31, 351
See application file for complete search history.

(56) References Cited

U.S. PATENT DOCUMENTS

| | | | |
|---|---|---|---|
| 7,463,639 B1 * | 12/2008 | Rekhter ......................... | 370/409 |
| 2006/0233155 A1 * | 10/2006 | Srivastava ..................... | 370/351 |
| 2007/0030846 A1 | 2/2007 | Szczesniak et al. | |
| 2007/0286093 A1 | 12/2007 | Cai et al. | |

(Continued)

FOREIGN PATENT DOCUMENTS

| | | |
|---|---|---|
| CN | 101243648 A | 8/2008 |
| CN | 101447915 A | 6/2009 |

(Continued)

OTHER PUBLICATIONS

Extended European Search Report issued in corresponding European Patent Application No. 12185379.0, mailed Jan. 16, 2013.

(Continued)

*Primary Examiner* — Anh Ngoc Nguyen
(74) *Attorney, Agent, or Firm* — Brinks Gilson & Lione (57) ABSTRACT

The present invention discloses a method, an apparatus, and a system for forwarding a packet in a multi-topology network, relating to the field of communications technologies. The method includes: receiving, by an ingress node in the multi-topology network, a packet sent by a first network, and obtaining information of an ingress interface receiving the packet; where the first network is a network except the multi-topology network; obtaining a routing information base RIB or a forwarding information base FIB of a corresponding downlink topology according to the information of the ingress interface; and forwarding the packet to an egress node in the multi-topology network according to the RIB or the FIB of the corresponding downlink topology.

9 Claims, 4 Drawing Sheets

(56) References Cited

U.S. PATENT DOCUMENTS

| | | | |
|---|---|---|---|
| 2008/0008168 A1* | 1/2008 | Nadeau et al. | 370/389 |
| 2008/0123663 A1* | 5/2008 | Kanagala | 370/395.32 |
| 2009/0109852 A1* | 4/2009 | Grover et al. | 370/235 |
| 2009/0252058 A1 | 10/2009 | Chen et al. | |
| 2010/0061269 A1 | 3/2010 | Banerjee et al. | |
| 2010/0312913 A1 | 12/2010 | Wittenschlaeger | |
| 2011/0013518 A1* | 1/2011 | Kwapniewski et al. | 370/238 |

FOREIGN PATENT DOCUMENTS

| | | |
|---|---|---|
| CN | 101997758 A | 3/2011 |
| CN | 102035741 A | 4/2011 |

OTHER PUBLICATIONS

International Search Report issued in corresponding PCT Patent Application No. PCT/CN2012/081219, mailed Dec. 27, 2012.

Cisco Systems, "Multi-Topology Routing" Feb. 27, 2007.

Przygienda et al., "M-ISIS: Multi Topology (MT) Routing in Intermediate System to Intermediate Systems (IS-ISs)" Network Working Group, Feb. 2008.

* cited by examiner

METHOD, APPARATUS, AND SYSTEM FOR FORWARDING PACKET IN MULTI-TOPOLOGY NETWORK

CROSS-REFERENCE TO RELATED APPLICATIONS

This application claims priority to Chinese Patent Application No. 201110286466.9, filed on Sep. 23, 2011, which is hereby incorporated by reference in its entirety.

FIELD OF THE INVENTION

The present invention relates to the field of communications technologies, and in particular, to a method, an apparatus, and a system for forwarding a packet in a multi-topology network.

BACKGROUND OF THE INVENTION

To accommodate multiple application demands such as service separation and in-band management, network multi-topology technologies emerge as required. One physical network may be divided into multiple logical networks, that is, multiple logical topologies. How to transmit data in a multi-topology network is a problem to be solved in the network topology technologies.

The existing multi-topology technology defines a way for selecting an RIB/FIB (Routing Information Base/Forward Information Base, routing information base/forwarding information base) in the multi-topology network, that is, defines packet forwarding within multiple logical topologies in a physical topology network. If the multi-topology network has two topologies, topology 1 and topology 2, an ingress node (Ingress node) in the multi-topology network has two RIBs/FIBs, respectively recording routing information in topology 1 and topology 2 and both for directing forwarding. If a packet is initiated by the Ingress node in the multi-topology network, a topology whose RIB/FIB is to be selected may be specified on the Ingress node, and the packet is forwarded according to the selected RIB/FIB of a downlink topology.

The prior art only defines how to perform data forwarding in a multi-topology network in the case where a packet is initiated from the ingress node in the multi-topology network. However, before the introduction of the multi-topology network, a physical topology and a logical topology are combined into one. This combined topology is a default topology network under the concept of the multi-topology network. A practical transport network is formed by a default topology network and a multi-topology network. If the packet is initiated from the default topology network, and duplicate destination addresses exist, after receiving the packet, the ingress node in the multi-topology network does not know the topology whose RIB/FIB is to be selected due to the duplicate destination addresses, and consequently fails to correctly select a route for the packet.

SUMMARY OF THE INVENTION

Embodiments of the present invention provide a method, an apparatus, and a system for forwarding a packet in a multi-topology network. The technical solutions are as follows:

In one aspect, a method for forwarding a packet in a multi-topology network is provided. The method includes:

receiving, by an ingress node in the multi-topology network, a packet sent by a first network, and obtaining information of an ingress interface receiving the packet; where the first network is a network except the multi-topology network;

obtaining a routing information base RIB or a forwarding information base FIB of a corresponding downlink topology according to the information of the ingress interface; and forwarding the packet to an egress node in the multi-topology network according to the RIB or the FIB of the corresponding downlink topology.

In one aspect, an ingress node in a multi-topology network is provided. The ingress node includes:

a receiving module, configured to receive a packet sent by a first network and obtain information of an ingress interface receiving the packet; where the first network is a network except the multi-topology network;

an obtaining module, configured to obtain a routing information base RIB or a forwarding information base FIB of a corresponding downlink topology according to the information of the ingress interface; and a forwarding module, configured to forward the packet to an egress node in the multi-topology network according to the RIB or the FIB of the corresponding downlink topology.

In another aspect, an egress node in a multi-topology network is provided. The egress node includes:

a receiving module, configured to receive a packet that is forwarded, according to a routing information base RIB or a forwarding information base FIB of a downlink topology, by an ingress node in the multi-topology network; and a processing module, configured to, after the receiving module receives the packet, delete a multi-topology attribute of the packet and continue forwarding the packet.

In another aspect, a system for forwarding a packet in a multi-topology network is further provided. The system includes: the above-described ingress node in the multi-topology network and the above-described egress node in the multi-topology network.

The technical solutions provided in the embodiments of the present invention create the following beneficial effect: The ingress interface is associated with the downlink topology; after the ingress node receives a packet, the corresponding downlink topology may be found according to the information of the ingress interface so that the problem that the downlink topology fails to be correctly selected in the case of duplicate destination addresses is solved.

BRIEF DESCRIPTION OF THE DRAWINGS

To make the technical solutions in the embodiments of the present invention clearer, the accompanying drawings for illustrating the embodiments of the present invention are briefly described below. Apparently, the accompanying drawings are only some embodiments of the present invention, and persons of ordinary skill in the art may derive other drawings from such accompanying drawings without creative efforts.

DETAILED DESCRIPTION OF THE EMBODIMENTS

To make the objectives, technical solutions, and advantages of the present invention clearer, the embodiments of the present invention will be described below in further detail with reference to the accompanying drawings.

Figure 1:
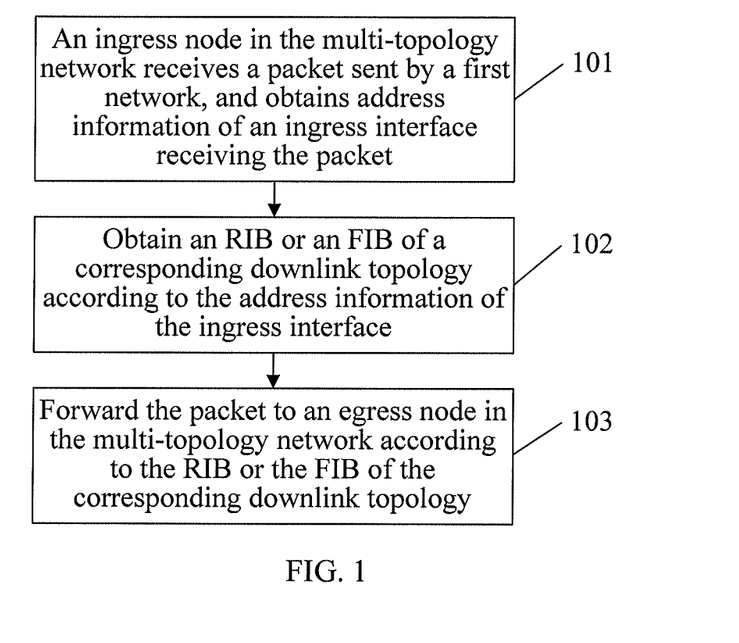
FIG. 1 is a flowchart of a method for forwarding a packet in a multi-topology network according to an embodiment of the present invention.

Referring to FIG. 1, an embodiment of the present invention provides a method for forwarding a packet in a multi-topology network. In this embodiment, an ingress node in the multi-topology network receives a packet sent by a first topology network, and forwards the packet in the multi-topology network. The first topology network is any network except the multi-topology network, the first topology network is an uplink topology of the multi-topology network, and a path for the multi-topology network to forward the packet within a local network is a downlink topology. The ingress node in the multi-topology network includes at least one ingress interface. The ingress interface is used to receive packets from different topology networks. Specifically, the method in this embodiment includes:

101: An ingress node in the multi-topology network receives a packet sent by a first network, and obtains information of an ingress interface receiving the packet.

102: Obtain an RIB or an FIB of a corresponding downlink topology according to the information of the ingress interface.

103: Forward the packet to an egress node in the multi-topology network according to the RIB or the FIB of the corresponding downlink topology.

Optionally, in this embodiment, the determining the RIB or the FIB of the corresponding downlink topology according to the information of the ingress interface includes:

searching, in a pre-stored mapping relationship between address information of the ingress interface and a downlink topology, for a downlink topology corresponding to the address information of the ingress interface, and obtaining the RIB or the FIB of the downlink topology.

Optionally, in this embodiment, the determining the RIB or the FIB of the corresponding downlink topology according to the information of the ingress interface includes:

searching, in a pre-stored mapping relationship between address information of the ingress interface and a VPN (Virtual Private Network, virtual private network), for a VPN corresponding to the address information of the ingress interface, obtaining the corresponding downlink topology according to the VPN, and obtaining the RIB or the FIB of the downlink topology.

Further, in this embodiment, after the ingress node in the multi-topology network receives the packet sent by the first network, the method further includes:

adding a multi-topology attribute to the packet so that a node in the multi-topology network is capable of identifying the packet; and correspondingly, after the forwarding the packet to an egress node in the multi-topology network according to the RIB or the FIB of the corresponding downlink topology, the method further includes:

deleting, by the egress node, the multi-topology attribute of the packet and continuing forwarding the packet.

The method embodiment provided in the present invention creates the following beneficial effect: The ingress interface is associated with the downlink topology; after the ingress node receives a packet, the corresponding downlink topology may be found according to the information of the ingress interface so that the problem that the downlink topology fails to be correctly selected in the case of duplicate destination addresses is solved.

Figure 2:
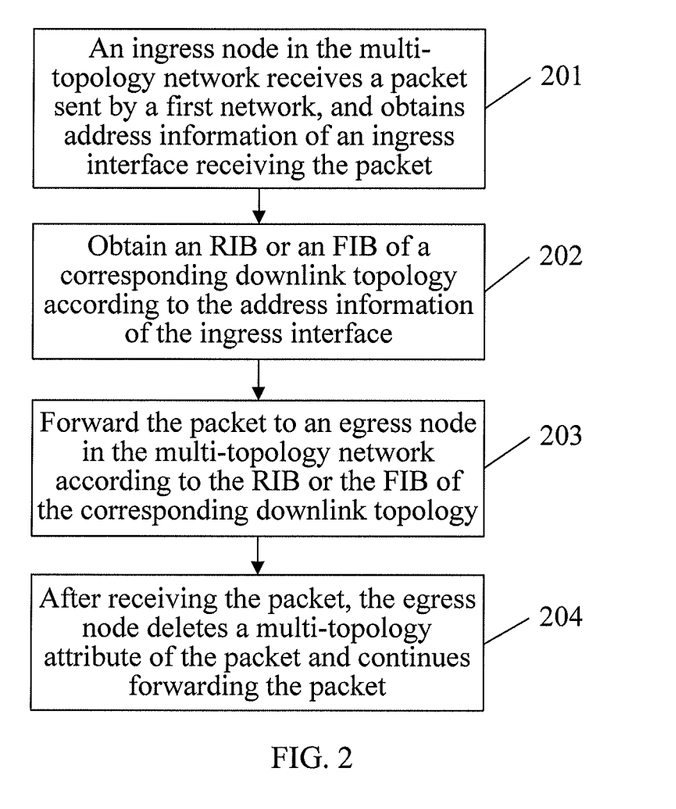
FIG. 2 is a flowchart of a method for forwarding a packet in a multi-topology network according to another embodiment of the present invention.

Referring to FIG. 2, an embodiment of the present invention provides a method for forwarding a packet in a multi-topology network. In this embodiment, an Ingress device in the multi-topology network is expanded so that the ingress device is capable of specifying a mapping relationship between an uplink interface and a downlink topology. In this manner, when receiving a packet from a default topology network, the ingress device is capable of determining, according to an ingress interface, a topology whose RIB/FIB is to be selected. The method specifically includes:

201: An ingress node in the multi-topology network receives a packet sent by a first network, and obtains information of an ingress interface receiving the packet.

In this embodiment, the multi-topology network is a downlink topology network of the first network, and the first network is any network except the multi-topology network, including a default topology network and another topology network, which is not specifically defined in this embodiment. This embodiment is described by using the first topology network as the default topology network.

Figure 3:
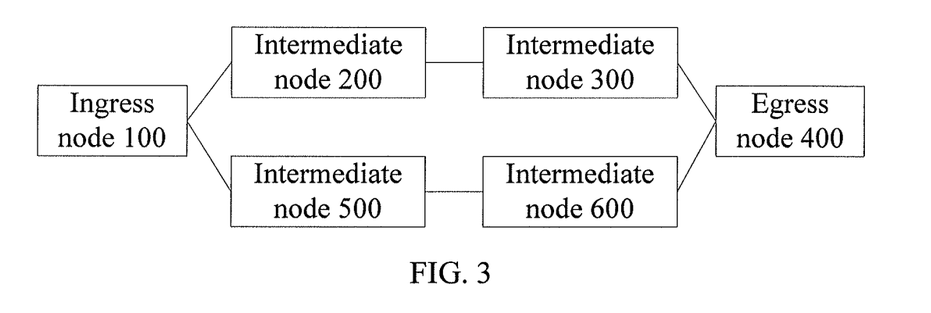
FIG. 3 is a schematic structural diagram of a multi-topology network according to another embodiment of the present invention.

The application scenario according to this embodiment is shown in FIG. 3. The default topology network and the multi-topology network exist in a transport network. The multi-topology network has two topologies, topology 1 and topology 2. A link of topology 1 starts from an ingress node 100, passes through an intermediate node 200 and an intermediate node 300, and finally reaches an egress node 400; and a link of topology 1 starts from the ingress node 100, passes through an intermediate node 500 and an intermediate node 600, and finally reaches the egress node 400. The default topology network is connected to an ingress interface on the ingress node in the multi-topology network, and forwards the packet to the ingress node in the multi-topology network by using the ingress interface. The packet carries a multi-topology attribute. After receiving the packet forwarded by the default topology network, the ingress node obtains the information of the ingress interface receiving the packet, and further finds the corresponding downlink topology according to the information of the ingress interface. The information of the ingress interface is interface attribute information of the ingress interface, including address information of the ingress interface, and so on, which is not specifically defined in this embodiment.

In this embodiment, after receiving the packet forwarded by the default network, the ingress node in the multi-topology network adds the multi-topology attribute to the packet so that an intermediate node in the multi-topology network is capable of identifying the packet.

202: Obtain an RIB or an FIB of a corresponding downlink topology according to the information of the ingress interface.

In this embodiment, an Ingress device in the multi-topology network is expanded so that the ingress device is capable of specifying a mapping relationship between an uplink interface and a downlink topology. Specifically, a mapping relationship between the information of the ingress interface and the downlink topology may be pre-stored. That is, it is directly specified to which topology the ingress interface belongs. The packet received from the interface may be forwarded using the RIB or the FIB of the corresponding topology. The pre-stored mapping relationship between the address information of the ingress interface and the downlink topology may be stored in the form of a table. The table includes: the mapping relationship between the address information of the ingress interface and the downlink topology, that is, a downlink transmission link corresponding to the address of the ingress interface. Table 1 is a first mapping table stored by the ingress node shown in FIG. 3.

TABLE 1

| Ingress Interface | Ingress Interface Address Information | Downlink Topology Corresponding to the Ingress Interface |
|---|---|---|
| 1 | X | Topology network 1 |
| 2 | Y | Topology network 2 |
| ... | ... | ... |
| N | Z | Topology network 1 |

The ingress interface as shown in Table 1 has N ingress interfaces. The addresses of the N ingress interfaces are respectively X, Y ..., and a downlink topology corresponding to each ingress interface address is shown in Table 1. The address of ingress interface 1 is X, and its corresponding downlink topology is topology network 1, indicating that when the packet reaches the ingress node from the ingress interface, the ingress node forwards the packet by using topology network 1. The address of ingress interface 2 is Y, and its corresponding downlink topology is topology network 2, indicating that when the packet reaches the ingress node from the ingress interface, the ingress node forwards the packet by using topology network 2.

In this embodiment, optionally, the obtaining the RIB or the FIB of the corresponding downlink topology according to the information of the ingress interface includes: searching, by the ingress node in the pre-stored mapping relationship between the address information of the ingress interface and the downlink topology, for the downlink topology corresponding to the address information of the ingress interface, and obtaining the RIB or the FIB of the downlink topology.

Optionally, in this embodiment, the downlink topology corresponding to the ingress interface may be not directly specified. The downlink topology corresponding to the ingress interface may be found in an indirect selection manner. Specifically, assume that the topology network interacts with the VPN, and the mapping relationship between the information of the ingress interface and the VPN is pre-stored. The mapping relationship between the address information of the ingress interface and the VPN may be stored in the form of a table. Table 2 is a second mapping table.

TABLE 2

| Ingress Interface | Ingress Interface Address Information | VPN Corresponding to the Ingress Interface | Tunnel Policy Corresponding to the VPN | Downlink Topology Corresponding to the Tunnel Policy Corresponding to the VPN |
|---|---|---|---|---|
| 1 | X | VPN 1 | Tunnel Policy 1 | Topology network 1 |
| 2 | Y | VPN 2 | Tunnel Policy 2 | Topology network 2 |
| ... | ... | ... | ... | ... |
| N | Z | VPN 1 | Tunnel Policy 1 | Topology network 1 |

The second mapping table includes the mapping relationship between the address information of the ingress interface and the VPN. In this embodiment, according to the preset second mapping table, the obtaining the RIB or the FIB of the corresponding downlink topology according to the information of the ingress interface specifically includes: searching, in the preset second mapping table, for the VPN corresponding to the address information of the ingress interface; and obtaining the corresponding downlink topology according to the VPN and obtaining the RIB or the FIB of the downlink topology. As shown in Table 2, each ingress interface corresponds to a VPN. After receiving a packet, the ingress node may find, according to the information of the ingress interface receiving the packet, the VPN corresponding to the ingress interface, and further select the RIB or the FIB of the corresponding topology according to the VPN to forward the packet. For example, default topology network 1 is connected to ingress interface 1 of the ingress node in the multi-topology network, and ingress interface 1 corresponds to VPN 1, and default topology network 2 is connected to ingress interface 2 of the ingress node in the multi-topology network, and ingress interface 2 corresponds to VPN 2; in this case, after receiving a packet sent by default ingress interface 1, ingress interface 1 obtains the information of the ingress interface, finds the corresponding VPN 1 according to the information of the ingress interface, and continues forwarding the packet to the egress node by using the downlink topology corresponding to VPN 1.

In this embodiment, the "mapping relationship between an uplink ingress interface and a downlink topology" may be specified in many manners, for example, configuration by using command lines, and database loading. In addition, there are many mapping relationships, for example, direct mapping and indirect mapping, which are not specifically defined in this embodiment.

203: Forward the packet to an egress node in the multi-topology network according to the RIB or the FIB of the corresponding downlink topology.

In this embodiment, after the corresponding downlink topology is found according to the address information of the ingress interface of the ingress node, the packet may be forwarded according to the RIB/FIB of the downlink topology. Specifically, during the process of packet forwarding, the RIB/FIB of the downlink topology is added so that an intermediate node in the downlink topology, after receiving the packet, searches for the RIB/FIB of the downlink topology carried in the packet and continues forwarding the packet according to the RIB/FIB of the downlink topology.

In this embodiment, during packet forwarding over a downlink topology link, the multi-topology attribute of the packet is still maintained.

204: After receiving the packet, the egress node deletes the multi-topology attribute of the packet and continues forwarding the packet.

In this embodiment, after receiving the packet sent by the multi-topology network, the egress node in the multi-topology network deletes the multi-topology attribute of the packet and continues forwarding the packet by using the RIB/FIB of the default topology network. The next topology network of the egress node may be the default topology network, or another topology network. If it is the default topology network, the packet is forwarded by using the RIB/FIB of the default topology network and if it is another topology network, the packet is forwarded by using the RIB/FIB of the other topology, which is not specifically defined in this embodiment.

The method embodiment provided in the present invention creates the following beneficial effect: The ingress interface is associated with the downlink topology; after the ingress node receives a packet, the corresponding downlink topology may be found according to the information of the ingress interface so that the problem that the downlink topology fails to be correctly selected in the case of duplicate destination addresses is solved. In addition, after the multi-topology network interacts with the VPN, the multi-topology may be supported in the control plane, without any change in the forwarding plane. This reduces the deployment costs of the multi-topology technology.

Figure 4:
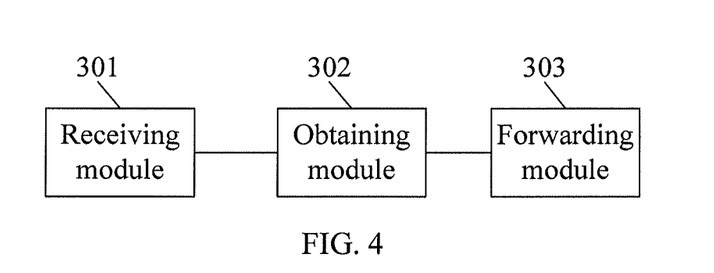
FIG. 4 is a schematic diagram of an ingress node in a multi-topology network according to another embodiment of the present invention.

Referring to FIG. 4, an embodiment of the present invention provides an ingress node in a multi-topology network, including: a receiving module 301, an obtaining module 302, and a forwarding module 303.

The receiving module 301 is configured to receive a packet sent by a first network and obtain information of an ingress interface receiving the packet; where the first network is a network except the multi-topology network.

The obtaining module 302 is configured to obtain a routing information base RIB or a forwarding information base FIB of a corresponding downlink topology according to the information of the ingress interface.

The forwarding module 303 is configured to forward the packet to an egress node in the multi-topology network according to the RIB or the FIB of the corresponding downlink topology.

Figure 5:
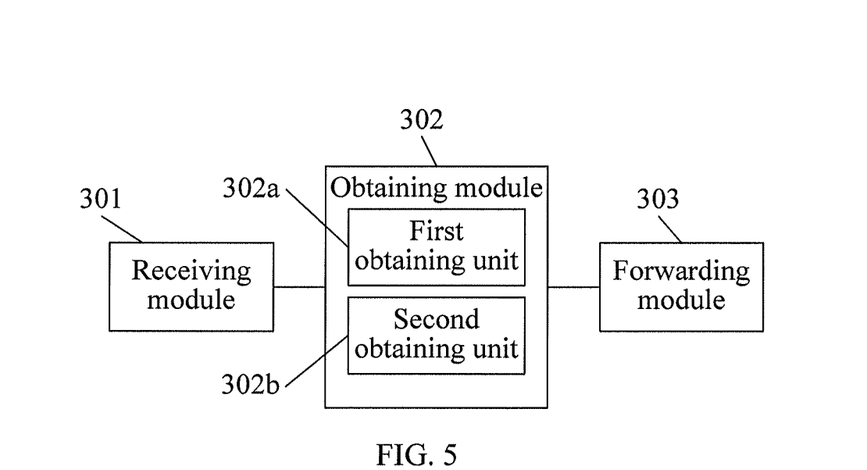
FIG. 5 is a schematic diagram of an ingress node in a multi-topology network according to another embodiment of the present invention.

Optionally, referring to FIG. 5, in this embodiment, the obtaining module 302 includes:
  a first obtaining unit 302*a*, configured to search, in a pre-stored mapping relationship between address information of the ingress interface and a downlink topology, for a downlink topology corresponding to the address information of the ingress interface, and obtain the RIB or the FIB of the downlink topology.

Optionally, referring to FIG. 5, in this embodiment, the obtaining module 302 includes:
  a second obtaining unit 302*b*, configured to search, in a pre-stored mapping relationship between address information of the ingress interface and a VPN, for a virtual private network VPN corresponding to the address information of the ingress interface, obtain the corresponding downlink topology according to the VPN, and obtain the RIB or the FIB of the downlink topology.

Further, in this embodiment, the receiving module 301 is further configured to:
  after the ingress node in the multi-topology network receives the packet sent by the first network, add a multi-topology attribute to the packet so that a node in the multi-topology network is capable of identifying the packet.

Figure 6:
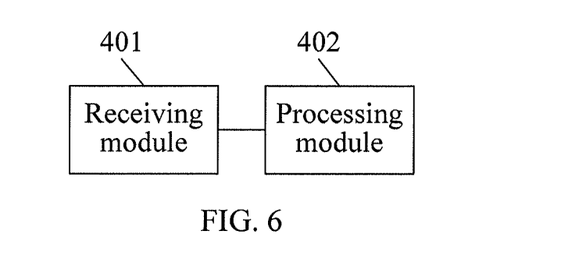
FIG. 6 is a schematic diagram of an egress node in a multi-topology network according to another embodiment of the present invention.

Referring to FIG. 6, an embodiment of the present invention provides an egress node in a multi-topology network, including: a receiving module 401 and a processing module 402.

The receiving module 401 is configured to receive a packet that is forwarded, according to a routing information base RIB or a forwarding information base FIB of a downlink topology, by an ingress node in the multi-topology network.

The processing module 402 is configured to, after the receiving module 401 receives the packet, delete a multi-topology attribute of the packet and continue forwarding the packet.

Figure 7:
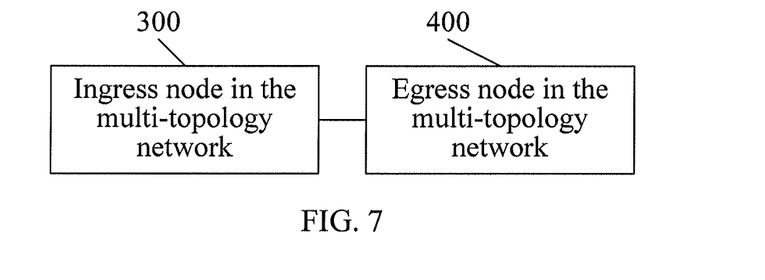
FIG. 7 is a schematic diagram of a system for forwarding a packet in a multi-topology network according to an embodiment of the present invention.

Referring to FIG. 7, an embodiment of the present invention provides a system for forwarding a packet in a multi-topology network, including the ingress node 300 in the multi-topology network described in the preceding embodiment and the egress node 400 in the multi-topology network described in the preceding embodiment.

In this embodiment, the ingress node includes:
  a receiving module, configured to receive a packet sent by a first network and obtain information of an ingress interface receiving the packet; where the first network is a network except the multi-topology network;
  an obtaining module, configured to obtain a routing information base RIB or a forwarding information base FIB of a corresponding downlink topology according to the information of the ingress interface; and
  a forwarding module, configured to forward the packet to the egress node in the multi-topology network according to the RIB or the FIB of the corresponding downlink topology.

Optionally, the obtaining module includes:
  a first obtaining unit, configured to search, in a pre-stored mapping relationship between address information of the ingress interface and a downlink topology, for a downlink topology corresponding to the address information of the ingress interface, and obtain the RIB or the FIB of the downlink topology.

Optionally, the obtaining module includes:
  a second obtaining unit, configured to search, in a pre-stored mapping relationship between address information of the ingress interface and a VPN, for a virtual private network VPN corresponding to the address information of the ingress interface, obtain the corresponding downlink topology according to the VPN, and obtain the RIB or the FIB of the downlink topology.

Further, the receiving module is further configured to:
  after the ingress node in the multi-topology network receives the packet sent by the first network, add a multi-topology attribute to the packet so that a node in the multi-topology network is capable of identifying the packet.

In this embodiment, the egress node includes:
  a receiving module, configured to receive the packet that is forwarded, according to the routing information base RIB or the forwarding information base FIB of the downlink topology, by the ingress node in the multi-topology network; and
  a processing module, configured to, after the receiving module receives the packet, delete the multi-topology attribute of the packet and continue forwarding the packet.

The apparatus embodiments provided in the present invention create the following beneficial effect: The ingress interface is associated with the downlink topology; after the ingress node receives a packet, the corresponding downlink topology may be found according to the information of the ingress interface so that the problem that the downlink topology fails to be correctly selected in the case of duplicate destination addresses is solved.

The apparatus (including the ingress node and the egress node in the multi-topology network) and system provided in this embodiment may be derived from the same concept as the method embodiments. For details of the implementation process, refer to the method embodiments, which are not detailed here.

Persons of ordinary skill in the art may understand that all or a part of steps of various methods in the preceding embodiments may be implemented by hardware or by a program instructing relevant hardware. The program may be stored in a computer readable storage medium. The storage medium may be, for example, a read only memory, a magnetic disk, or an optical disk, and so on.

The foregoing descriptions are merely exemplary embodiments of the present invention, but not intended to limit the present invention. Any modification, equivalent replacement, or improvement made without departing from the spirit and principle of the present invention should fall within the protection scope of the present invention.

What is claimed is:

1. A method for forwarding a packet in a multi-topology network, comprising:
   receiving, by an ingress node in the multi-topology network, a packet sent by a first network, and obtaining an address information of an ingress interface receiving the packet; wherein the first network is a network except the multi-topology network;
   obtaining a routing information base RIB or a forwarding information base FIB of a downlink topology corresponding to the address information of the ingress interface; and
   forwarding the packet to an egress node in the multi-topology network according to the RIB or the FIB of the corresponding downlink topology.

2. The method according to claim 1, wherein the obtaining the RIB or the FIB of the downlink topology corresponding to the address information of the ingress interface comprises:
   searching, in a pre-stored mapping relationship between the information of the ingress interface and the downlink topology, for the downlink topology corresponding to the address information of the ingress interface, and obtaining the RIB or the FIB of the downlink topology.

3. The method according to claim 1, wherein the obtaining the RIB/FIB of the downlink topology corresponding to the address information of the ingress interface comprises:
   searching, in a pre-stored mapping relationship between the address information of the ingress interface and a virtual private network VPN, for the VPN corresponding to the address information of the ingress interface, obtaining the downlink topology according to the VPN, and obtaining the RIB or the FIB of the downlink topology.

4. The method according to claim 1, wherein after the receiving, by the ingress node in the multi-topology network, the packet sent by the first network, the method further comprises:
   adding a multi-topology attribute to the packet so that a node in the multi-topology network is capable of identifying the packet; and
   correspondingly, after the forwarding the packet to an egress node in the multi-topology network according to the RIB or the FIB of the downlink topology, the method further comprises:
   deleting, by the egress node, the multi-topology attribute of the packet and continuing forwarding the packet.

5. An ingress node in a multi-topology network, comprising:
   a receiving module, configured to receive a packet sent by a first network and obtain an address information of an ingress interface receiving the packet; wherein the first network is a network except the multi-topology network;
   an obtaining module, configured to obtain a routing information base RIB or a forwarding information base FIB of a downlink topology corresponding to the address information of the ingress interface; and
   a forwarding module, configured to forward the packet to an egress node in the multi-topology network according to the RIB or the FIB of the corresponding downlink topology.

6. The ingress node according to claim 5, wherein the obtaining module comprises:
   a first obtaining unit, configured to search, in a pre-stored mapping relationship between the address information of the ingress interface and the downlink topology, for the downlink topology corresponding to the address information of the ingress interface, and obtain the RIB or the FIB of the downlink topology.

7. The ingress node according to claim 5, wherein the obtaining module comprises:
   a second obtaining unit, configured to search, in a pre-stored mapping relationship between the address information of the ingress interface and a virtual private network VPN, for the VPN corresponding to the address information of the ingress interface, obtain the downlink topology according to the VPN, and obtain the RIB or the FIB of the downlink topology.

8. The ingress node according to claim 5, wherein the receiving module is further configured to:
   after the ingress node in the multi-topology network receives the packet sent by the first network, add a multi-topology attribute to the packet so that a node in the multi-topology network is capable of identifying the packet.

9. An egress node in a multi-topology network, comprising:
   a receiving module, configured to receive a packet that is forwarded, according to a routing information base RIB or a forwarding information base FIB of a downlink topology corresponding to an address information of an ingress interface, by an ingress node in the multi-topology network; and
   a processing module, configured to, after the receiving module receives the packet, delete a multi-topology attribute of the packet and continue forwarding the packet.

* * * * *